March 6, 1951     C. R. MASON     2,544,339
ELECTRICAL REGULATOR
Filed May 29, 1946
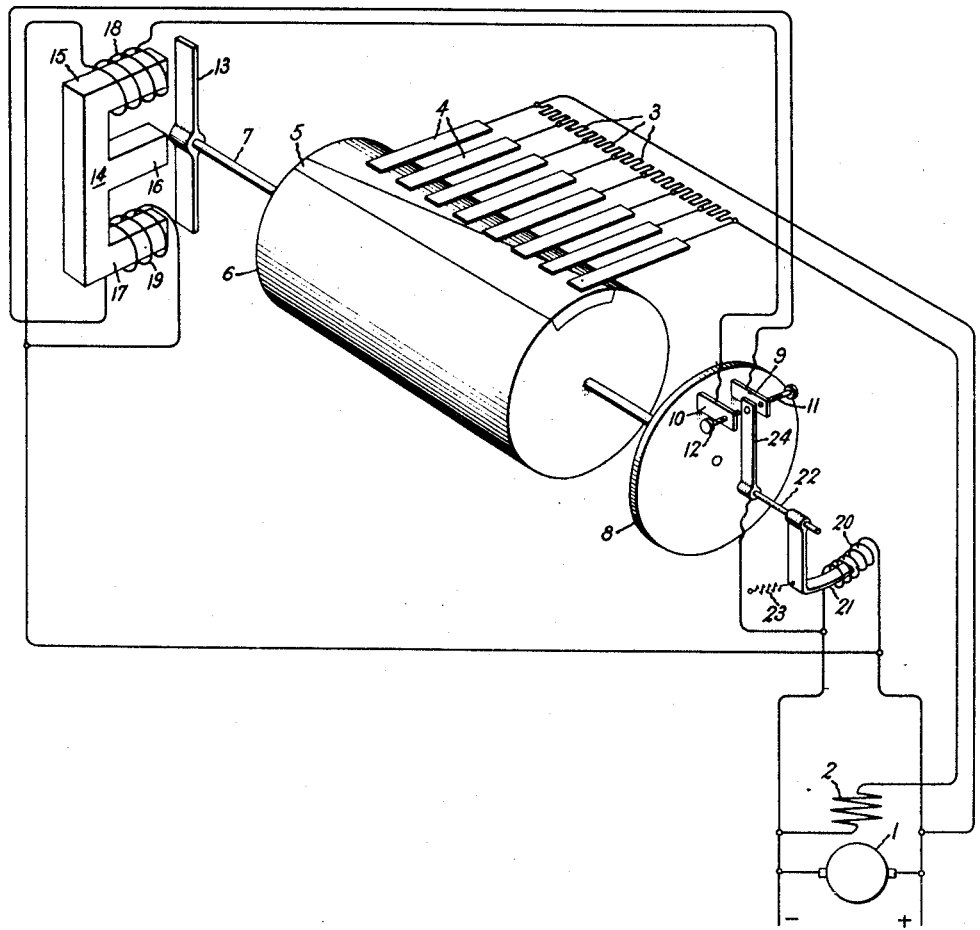
Inventor:
Charles R. Mason,
by His Attorney.

Patented Mar. 6, 1951

2,544,339

UNITED STATES PATENT OFFICE 2,544,339

ELECTRICAL REGULATOR

Charles R. Mason, Ballston Spa, N. Y., assignor to General Electric Company, a corporation of New York Application May 29, 1946, Serial No. 672,990

10 Claims. (Cl. 201—48)

1

My invention relates to electrical regulators, and more particularly to improvements in automatic variable-resistance type regulators for electrical machines and circuits.

Automatic variable-resistance type regulators, in which a plurality of contact fingers are sequentially engaged with a shorting bar or surface in response to a condition of the machine or circuit to be regulated, have been used in the regulator art for many years. This type of regulation possesses certain benefits not found in the vibratory contact type of regulator in that the continuous opening and closing of contacts and the resulting noise and wear on the regulator parts is not present. One disadvantage inherent in the variable resistance regulators in which contact fingers are engaged or shorted by a slidable member is the presence of objectionable friction between the contact fingers and the movable member, thus preventing accurate positioning of the movable member. As it is customary to actuate the shorting member by means of a condition responsive element having a limited amount of operating force, it can be seen that as the condition responsive element approaches the position where the spring biasing forces and the electromagnetic forces are approximately balanced, there is available very slight net force to overcome the effects of friction. Consequently, the shorting bar never attains the exact position called for by the condition responsive element in order to adjust properly the regulated condition of the machine or circuit, and the result is a wide band over which the regulator operates.

Accordingly, it is an object of my invention to provide a new and improved electrical regulator for an electrical machine or circuit.

Another object of my invention is to provide an improved automatic resistance type regulator in which the effect of contact friction is eliminated.

A further object of my invention is to provide an improved automatic variable-resistance type of regulator in which an electromechanical follow-up or amplifying system is used to position the resistance adjusting member, thereby eliminating the effects of contact friction.

In accordance with my invention in one form, there is provided a generator voltage regulator having a voltage responsive element designed for movement in one direction upon an increase of generator voltage, and in the opposite direction upon a decrease in generator voltage. The movement of the resistance shorting bar is accomplished by force applied by the voltage responsive element and also by a form of torque motor which is energized by the action of the voltage responsive element. The two forces thus assist in moving the resistance shorting bar in the proper direction to insert or decrease resistance in the generator field. The energization of the torque motor is accomplished by means of a mechanical circuit closing arrangement similar to a contact-making voltmeter, thereby the burden of mechanical load and friction is removed to a large extent from the voltage responsive element and its primary function is to close the proper contact for energizing the torque motor in the proper direction for adjustment of the generator field resistance.

My invention will be better understood from the following description taken in connection with the accompanying drawing and its scope will be pointed out in the appended claims.

In the drawing, the single figure represents an exaggerated perspective view of the elements of my invention and showing its electrical circuit connections for regulating the output voltage of a direct current generator. Referring to the drawing, I have shown a direct current generator having an armature 1 and a shunt excited field winding 2 connected across the positive and negative output leads of the generator and in series with the adjustable resistance 3. The resistance 3 is provided with a plurality of taps as shown, the number of taps depending upon the fineness of adjustment that is required in the generator voltage. Each tap of the resistance 3 is electrically connected to a flexible tensioned contact finger 4. For purposes of sequentially shorting out the various sections of the resistance 3, a tapered shorting bar 5 of conducting material is set flush in the surface of a rotatable member or cylinder 6 of insulating material. Thus as the cylinder rotates, additional contact fingers are selectively engaged with the shorting bar 5 or disengaged therefrom, and the amount of resistance in the field circuit 2 is accordingly adjusted. The cylinder 6 is mounted on a shaft 7 adapted for rotation in bearings (not shown) and carries at one end of the shaft a disk 8 on one side of which are mounted, in spaced relation near the periphery, a pair of contact supports 9 and 10 respectively. Each contact support is provided with an adjustable electrical contact, 11 and 12 respectively, shown as of the set-screw type, which may be adjusted to vary the gap between contacts. Mounted on the opposite end of the rotating shaft 7 is an armature 13 of magnetic material arranged so that it may be rotated through a small angle of rotation toward either pole piece, as the case may be, of the electromagnetic torque motor 14. While the torque motor 14 may be of any desired conventional type, for simplicity I have shown it as consisting of an E-shaped magnetizable core having an upper arm 15, a central arm 16 and a lower arm 17. For attracting the armature 13 toward the upper arm and thereby rotating the drum 6 in a counterclockwise direction, as viewed from the right side of the drawing, a magnetizing coil 18 is wound around the upper arm and connected in series with an electrical energy source and with the contact 12 carried by the disk 8. For attracting the armature toward the lower arm and thereby rotating the drum 6 in a clockwise direction, a coil 19 is disposed about the lower arm 17 and connected in series with the same energy source and with the contact 11 carried by the disk 8.

The voltage responsive or voltage sensitive element of this preferred form of my invention is schematically shown as an operating solenoid 20 connected across the output voltage of the electric generator 1. Therefore, the magnetic force produced by this coil will be proportional to the output voltage of the generator which voltage it is desired to regulate. Disposed for movement within the coil 20 is a magnetizable L-shaped armature 21 mounted for rotation with the shaft 22 which is mounted on bearings (not shown), and which is substantially in longitudinal alignment with the shaft 7. A tensioned spring 23 is connected to the armature 21 in such a manner as to oppose the magnetic force exerted by the coil 20 and is proportioned so that at required output voltage of the generator 1 the magnetic force of the coil 20 will be exactly balanced by the force exerted by the tension spring 23 and the armature will be positioned at its midpoint as shown in the drawing. Mounted on the other end of the rotating shaft 22 is a contact member 24 arranged so that upon movement of the armature 21 in a clockwise direction the contact 24 will engage with the contact 11, and upon operation of the armature in the reverse or counter-clockwise direction, contact 24 will engage with the contact 12. When coil 20 is energized, the assembly consisting of armature 21, shaft 22 and contact 24 moves disc 8 and drum 6 to a position near the desired one. In addition to the mechanical physical push of disc 8 and drum 6, contact 24 closes the electrical circuit through contact 12 and coil 18 or through contact 11 and coil 19 of the torque motor. The shaft 22 should be substantially coaxial with or in longitudinal alignment with the shaft 7 to prevent slipping of the contact making arm 24 when it pushes disc 8. However, a small amount of slip will do no harm and by cleaning the contacts may be advantageous.

The mechanical push is for quick action of the arm 24 on either the contact 11 or the contact 12 in rotating the disc 8 and the drum 6 to a point near the desired final position. The torque motor 14 assists the mechanical physical action of the arm 24 and in addition supplies the force accurately to position the drum 6 and the coil 8 by compensating for any frictional drag in the mechanical movement as the drum nears the proper position. The force exerted by the solenoid 20 in actuating armature 21 is sufficient to rotate the drum 6 throughout the major portion of its operating range; however, reliance is placed on the torque motor 14 for final accurate positioning of the drum. In tracing the electrical circuit for the energization of the torque motor operating coils, it can be seen that the voltage existing on the output terminals of the generator 1 is used to energize either of the operating coils depending on the position of the voltage responsive element and its contact-making arm 24.

The operation of my invention will be best explained by considering the device to be in the position as shown in the drawing, and assuming that for this position the generator voltage to be regulated is constant at its required value. In this position it will be seen that half of the contact fingers are engaged by the shorting bar 5 and effectively half of the field resistance 3 is shorted out. Assume now that due to suddenly decreased load on the generator 1 the output voltage of the generator rises beyond the permitted voltage regulation range. In this case the magnetic force created by the coil 20 will be increased and the armature 21 will be drawn into the coil 20 against the force of the tension spring 23. This in turn will move the contact member 24 in a counterclockwise direction until it makes contact with the contact 12, thereby rotating disc 8 and drum 6 in a counterclockwise direction and closing the circuit through the actuating coil 18 in the torque motor and energizing the arm 15 of the magnetic structure of the torque motor. This will attract the upper half of the magnetizable armature 13, turning it in a counterclockwise direction, and also the drum 6 and the contact shorting bar 5 associated therewith. As the drum turns in the counterclockwise direction, the contact fingers will be disengaged sequentially from the shorting bar and resistance will be added to the field circuit of the generator 1. The turning action of the armature 13, drum 6 and contact carrying disk 8 will continue until the electrical circuit between the contact 12 and the movable contact member 24 is broken due to restoration of generator voltage at the required level. As the voltage tends to decrease on the generator due to increased resistance in the field circuit, the voltage responsive element will back off slightly under influence of the tensioning spring, thus eliminating any tendency to overshoot the desired voltage level, and also assisting to break the electrical circuit at the contact 24. The action of the regulator is the same in a reverse direction under conditions whereby the generator voltage has decreased below the permissible limit. In this case the tensioning spring 23 will move the armature 21 and its contact member 24 in a clockwise direction against contact 11, thus rotating disc 8 and drum 6 in a clockwise direction and closing the electrical circuit through the contact member 24, the contact 11 and the lower coil 19 of the torque motor which, in turn, will attract the lower half of the armature 13 and rotate the contact shorting bar in a direction to engage progressively more of the contact fingers 4 and thereby decrease the resistance in the generator field circuit.

From the foregoing description it can be seen that by means of the follow-up system which I have provided, in which the voltage sensitive element is relieved of the frictional burden of the contact fingers and shorting bar, the contact drum 6 will be accurately positioned so that the proper amount of resistance is maintained in the generator field circuit. The amount of friction between the contact fingers 4 and the shorting bar 5 is therefore not important and can be increased to a value commensurate with obtaining good electrical contact between the fingers and the shorting bar, thereby preventing arcing or burning of the contact surfaces as the regulator operates, and making the contacting surfaces self-cleaning. The two contacts 11 and 12 connected to the follow-up unit and against which the movable contact member 24 bears are adjustable so that the amount of movement required of the voltage responsive unit can be increased or decreased. The amount of movement required before contact is made by the member 24 with either contact 11 or 12 determines to a large extent the band width or tolerance limit of the regulated voltage of the generator 1. Therefore, by adjusting the contacts 11 and 12 to decrease their gap, the regulating action may be limited to a very small tolerance, and the resulting regulated voltage of the generator will be held very closely to the desired value.

While I have shown and described a particular embodiment of my invention, it will be obvious to those skilled in the art that changes and modifications may be made without departing from my invention in its broader aspects, and therefore I aim in the appended claims to cover all such changes and modifications as fall within the true spirit and scope of my invention.

What I claim as new and desire to secure by Letters Patent of the United States, is:

1. An electrical condition responsive regulator comprising an electrical circuit, a multi-section resistor connected in said circuit, means for shorting selected ones of said resistor sections, a first electromagnetic means responsive to said condition for operating said shorting means, a second electromagnetic means for operating said shorting means, and electrical circuit switching means actuated by said first electromagnetic means for energizing said second electromagnetic means to assist said first electromagnetic means in operating said shorting means, said switching means deenergizing said second electromagnetic means again when said regulator reaches a position corresponding to a predetermined level of said electrical condition.

2. In a regulator, a multi-section resistor connectable in an electrical circuit, means for shorting selected ones of said sections, means for operating said shorting means, additional electromagnetic means for operating said shorting means, and electrical circuit switching means actuated by said first operating means for energizing said electromagnetic means for operation concurrently with said first operating means.

3. In a regulator, a multi-section resistor connectable in an electrical circuit, means including a plurality of conductive fingers and a movable conductive shunting member associated therewith for consecutively and cumulatively shunting selected ones of said sections, means for operating said shunting means, additional torque motor means to assist in operating said shunting means, and electrical circuit switching means actuated responsively to said first operating means for energizing said torque motor means.

4. A regulator comprising a multi-section resistor connectable in an electrical circuit, means for consecutively short-circuiting the sections of said resistor, means responsive to a predetermined signal for operating said short-circuiting means, additional electromagnetic means for operating said short-circuiting means, and electrical circuit switching means responsive to said first operating means for energizing said electromagnetic means during the time that said first operating means is in operation to assist said first operating means in the operation of said short-circuiting means.

5. A regulator comprising a multi-section resistor, means including a plurality of conductive fingers and a conductive shorting member rotatable with a shaft for consecutively and cumulatively short-circuiting the sections of said resistor, means including a disc mounted on said shaft and having two spaced apart projections thereon for operating said shorting means, an arm movably positioned between said projections for operating said shorting means in one direction by engaging one projection and in the other direction by engaging the other projection, torque motor means connected to said shaft to assist in operating said shorting means, and electrical circuit means actuated by the engagement of said movable member with said projections to energize said torque motor means.

6. A regulator comprising a multi-section resistor having a plurality of taps between adjoining sections, means for consecutively and cumulatively short-circuiting the sections of said resistor, said means comprising a plurality of tensioned flexible conductive fingers connected to said taps, a shaft and a conductive shorting member mounted on and rotatable with said shaft, a disc mounted on said shaft, a pair of spaced-apart projections on said disc, a movable arm positioned between said projections in operative relation therewith, electromagnetic means for moving said arm into engagement with one said projection for rotating said shorting member in one direction, and a biasing spring for moving said arm into engagement with the other projection in the absence of force exerted by said electromagnetic means for rotating said shorting member in the other direction, torque motor means for assisting in the rotation of said shorting member, said torque motor means comprising an elongated magnetizable armature mounted transversely on said shaft, an E-shaped magnetizable core positioned with the outer legs in spaced flux conducting relationship with the ends of said elongated member and the center leg in spaced flux conducting relationship with the central portion of said elongated member, and a pair of magnetizing windings positioned respectively on the outer legs of said core, and electrical circuit means connecting one magnetizing winding to one said projection and the other magnetizing winding to the other said projection in a manner such that the engagement of said movable arm with either of said projections causes the torque motor to assist in rotating the shorting member in the corresponding direction, said torque motor continuing in operation until said movable arm is disengaged from the projection.

7. In a regulator, a multi-section resistor connectable in an electrical circuit, means for consecutively and cumulatively short-circuiting the sections of said resistor, said means comprising a plurality of co-planar parallel spaced-part conductive fingers and a rotatable cylinder of non-conductive material in contact with said fingers, said cylinder having a tapered conductive shorting bar set flush in the surface thereof to consecutively engage said fingers as said cylinder is rotated, means for rotating said cylinder, additional electromagnetic means to assist in rotating said cylinder, and electrical circuit switching means actuated by said first cylinder rotating means for energizing said electromagnetic means.

8. In a regulator, a multi-section resistor connectable in the electrical circuit, means for consecutively and cumulatively short-circuiting the sections of said resistor, said means comprising a plurality of co-planar parallel spaced-apart tensioned flexible conductive fingers and a rotatable cylinder non-conductive material in contact with said fingers, said cylinder having a tapered conductive shorting bar set flush in the surface thereof to consecutively engage said fingers as said cylinder is rotated in one direction and consecutively disengage said fingers as said cylinder is rotated in the other direction, means for rotating said cylinder in either direction, additional electromagnetic means to assist in rotating said cylinder and to compensate for friction between said fingers and said cylinder, and electrical circuit switching means actuated by said first cylinder rotating means for energizing said electromagnetic means.

9. An electrical condition responsive regulator comprising an electrical circuit, a multi-section resistor connected in said circuit, rotatable means for consecutively short-circuiting the sections of said resistor, means for initiating operation of said rotatable means comprising a disc member having a pair of spaced-apart projections thereon connected to said rotatable means, a movable arm positioned between said projections in operative relation therewith, electromagnetic means for moving said arm into engagement with one said projection for moving said rotatable means in one direction, and a biasing spring for moving said arm into engagement with the other projection for moving said rotatable means in the other direction, torque motor means for assisting and completing the movement of said rotatable means, and electrical circuit means actuated by the engagement of said arm with either of said projections for energizing said torque motor means, said torque motor means continuing in operation until said movable arm is disengaged from the projection whereby said regulator always comes to rest with said movable arm disengaged from both projections.

10. An electrical condition responsive regulator comprising an electrical circuit, a multi-section resistor connected in said circuit, rotatable means for consecutively shunting the sections of said resistor, decaying force means for operating said rotatable means comprising a disc member having a pair of spaced apart projections thereon and connected to said rotatable means, a movable arm positioned between said projections in operative relation therewith, electromagnetic means for moving said arm into engagement with one said projection for moving said rotatable means in one direction, and a tensioned biasing spring for moving said arm into engagement with the other projection for moving said rotatable means in the other direction, additional means providing a substantially constant force for assisting and completing the movement of said rotatable means, and electrical circuit means actuated by the engagement of said arm with either of said projections for energizing said additional means.

CHARLES R. MASON.

REFERENCES CITED

The following references are of record in the file of this patent:

UNITED STATES PATENTS

| Number | Name | Date |
|---|---|---|
| 1,875,279 | Thompson | Aug. 30, 1932 |
| 2,068,551 | Landis | Jan. 19, 1937 |
| 2,136,257 | Thompson | Nov. 8, 1938 |
| 2,345,409 | Mason | Mar. 28, 1944 |
| 2,404,674 | Von Ohlsen | July 23, 1946 |